United States Patent [19]

Davenport et al.

[11] Patent Number: 4,868,458

[45] Date of Patent: Sep. 19, 1989

[54] XENON LAMP PARTICULARLY SUITED FOR AUTOMOTIVE APPLICATIONS

[75] Inventors: John M. Davenport, Lyndhurst; Richard L. Hansler, Pepper Pike, both of Ohio

[73] Assignee: General Electric Company, Schenectady, N.Y.

[21] Appl. No.: 157,359

[22] Filed: Feb. 18, 1988

[51] Int. Cl.⁴ ............................................ B60Q 1/02

[52] U.S. Cl. ................................... 315/77; 315/82; 315/83; 313/113; 313/115

[58] Field of Search ...................... 315/77, 80, 82, 83; 362/183, 20, 191, 83, 233; 313/113, 318, 643, 642, 115, 110

[56] References Cited

U.S. PATENT DOCUMENTS

| | | | |
|---|---|---|---|
| 3,364,378 | 1/1968 | Beesley | 313/113 |
| 3,688,149 | 8/1972 | Pitkgaan | 315/82 |
| 3,818,210 | 6/1974 | Pitkgaan | 315/82 |
| 4,513,357 | 4/1985 | Nieda et al. | 315/83 |
| 4,622,486 | 11/1986 | Endo | 313/115 |

*Primary Examiner*—Leo H. Boudreau
*Assistant Examiner*—Michael Razavi
*Attorney, Agent, or Firm*—John P. McMahon; Stanley C. Corwin; Fred Jacob

[57] ABSTRACT

Disclosed is a xenon lamp used for lighting applications and which is particularly suitable for automobile applications such as headlamps. The benefits of such usage, relative to incandescent lamps commonly employed for automotive forward lighting applications along with discharge lamps for lighting application, are primarily related to the size, shape, quality and concentration of the light generated by the xenon lamp and the ability to selectively move the position of the generated light relative to the reflector in which the xenon lamp is housed. The xenon lamp also provides the ability for the light to be generated by excitation of a D.C. source so as to be first positioned relative to the reflector to serve as the light source for low beam applications and then moved to a second position relative to the reflector to serve as the light source for high beam applications.

16 Claims, 6 Drawing Sheets

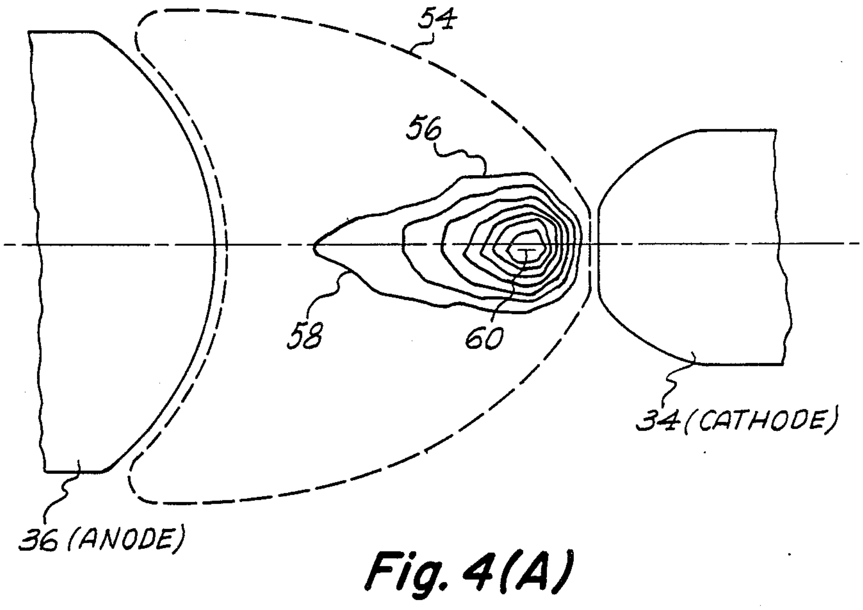
Fig. 4(A)
Fig. 4(B)
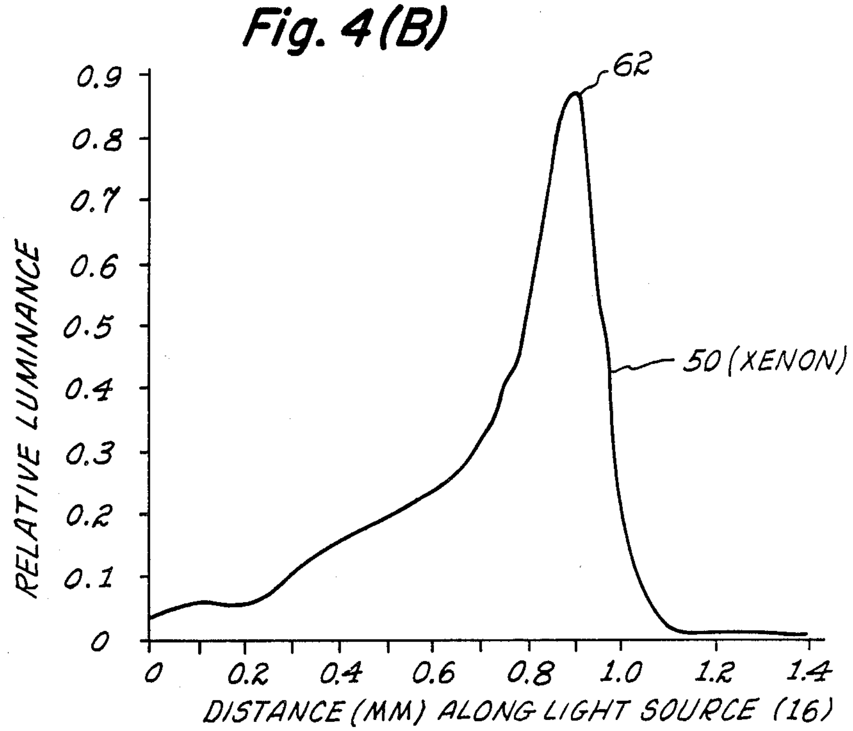

XENON LAMP PARTICULARLY SUITED FOR AUTOMOTIVE APPLICATIONS

CROSS REFERENCE TO RELATED APPLICATIONS U.S. patent application Ser. Nos. 157,436; and 157,360 filed herewith, respectively for "Metal Halide Lamp Having Vacuum Shroud for Reducing Cataphoretic Effects" of Hansler, French and Davenport and "Xenon-Metal Halide Lamp Particularly Suited For Automotive Applications" of Bergman, Davenport, and Hansler all assigned to the same assignee as the present invention, are all related to the present invention.

BACKGROUND OF THE INVENTION

The present invention relates to a xenon lamp for a vehicle such as an automobile, truck, bus, van or tractor for forward lighting applications. More particularly, the xenon lamp provides (1) for a reduction in the dimensions of the vehicle or automotive reflector housing such a lamp, (2) an improvement in the divergence of the light beam serving the automotive applications, and (3) both the low beam and high beam illumination needs of the vehicle.

Automotive designers are concerned in lowering the hood lines of cars in order to improve their appearance and aerodynamic performance. One of the primary factors that must be taken into account in such lowering is the required dimensions of the automotive headlamps. For example, the automotive headlamp has a requirement of providing substantially instantaneous light which is typically yielded by one or more tungsten incandescent filaments housed within automotive headlamps to provide for low and high beam illuminations. The one or more incandescent filaments must be comprised of at least certain dimensions such as the amount, length and wire size of tungsten in order to provide for the illumination needs of the automobile. These filament dimensions essentially define the light source of the headlamp which, in turn, determine the dimensions of the related reflector of the headlamp such as the reflector's size and shape in order to provide desired beam patterns at sufficient levels to serve the illumination needs of the headlamp. The size and shape of the reflector are limiting factors in lowering the hood line of cars.

It is desired that a light source for automotive headlamp other than an incandescent filament be provided such as a discharge type lamp not having a filament so that the dimensions of a related reflector may be reduced in order to allow the automotive designers to further pursue the lowering of the hood line of the automobile. It is further desired that the discharge light source provide for the instantaneous light for the automobile and also that a single such light source provide for both the low and high beam illumination needs of the automobile. Still further, in addition to the discharge light source serving the needs of automobile, it is desired that the instantaneous light source find lighting applications in the home, office and other commercial and industrial usages.

Accordingly, it is an object of the present invention to provide a discharge light source for lighting applications and which is particularly suited for automotive applications that provides for instantaneous light and for a reduction in the overall dimensions of the related reflector of an automotive headlamp.

It is a further object of the present invention to provide a single discharge lamp that acts as a light source to provide both the low and high beam illumination needs of the automobile.

SUMMARY OF THE INVENTION

The present invention is directed to a xenon light source having physical dimensions and operational characteristics finding various lighting applications and which is particularly suited to serve as a light source for an automotive headlamp.

The xenon light source has a pair of electrodes disposed and separated from each other by a predetermined distance therewithin. The xenon light source generates light at a high intensity which is concentrated at a spot in front of one of its electrodes rather than being spread between the electrodes such as that as which occurs for other discharge devices. This concentrated spot of generated light of the xenon light source provides for substantial reductions in the related reflectors for automotive and other applications relative to the use of light sources such as tungsten filaments and other discharge devices generating light spread across and between their separated electrodes. In one embodiment of the present invention the concentrated spot is selected to be positioned at a predetermined location relative to a reflector device so as to produce a desired illumination need such as low and high beam pattern for the automobile from a single source.

In another embodiment an automotive headlamp of the present invention comprises a reflector, a lens, and an inner envelope. The reflector has a section to which is mated means capable of being connected to an excitation source of an automobile. The reflector also has a predetermined focal point, a first location for the placement of a light source to provide low beam illumination of the headlamp, and a second location of the placement for a light source to provide high beam illumination of the headlamp. The lens of the automotive headlamp is mated to the front section of the reflector. The inner envelope is predetermined positioned within the reflector so as to be approximately disposed near the focal point of the reflector. The inner envelope contains a fill consisting of a xenon gas having a fill pressure in the range of about 4 atmospheres to about 15 atmospheres and an operating pressure in the range of about 20 atmospheres to about 65 atmospheres. The inner envelope also has a pair of electrodes disposed therein and separated from each other by a predetermined distance. The inner envelope is connected to the means mated to the section of the reflector so that the excitation source of the automobile is capable of being applied across the electrodes whereby upon such application the fill of xenon is excited and generates a high intensity source of light that is highly concentrated at a spot at a predetermined position in front of one of the pair of electrodes corresponding to the first or second location of the reflector. The concentrated spot has dimensions relatively smaller than the separation between the electrodes.

BRIEF DESCRIPTION OF THE DRAWINGS

FIGS. 4(A) and 4(B) respectively illustrate a relative isocandle plot of the light of the xenon light source and the energy distribution along the axis of the xenon light source.

DETAILED DESCRIPTION OF THE PREFERRED EMBODIMENTS

Figure 1:
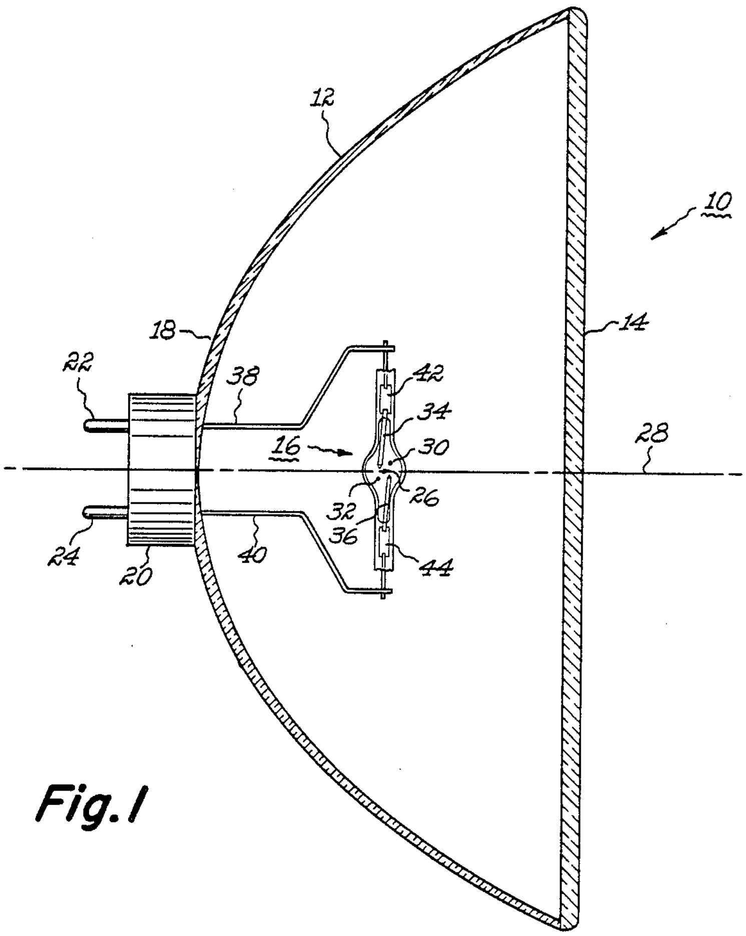
FIG. 1 is a side view generally illustrating an automotive headlamp in accordance with the present invention having its light source orientated in a vertical manner.

FIG. 1 is a side view generally illustrating an headlamp 10 for a vehicle such as an automobile in accordance with one embodiment the present invention. The automotive headlamp 10 comprises a reflector 12, a lens 14, and an inner envelope 16.

The reflector 12 has a rear section 18 to which is mated a plug 20 having prongs 22 and 24 that provides means for the automotive headlamp to be connected to an excitation source preferably of an automobile. The excitation source is preferably of a D.C. type.

Figure 2:
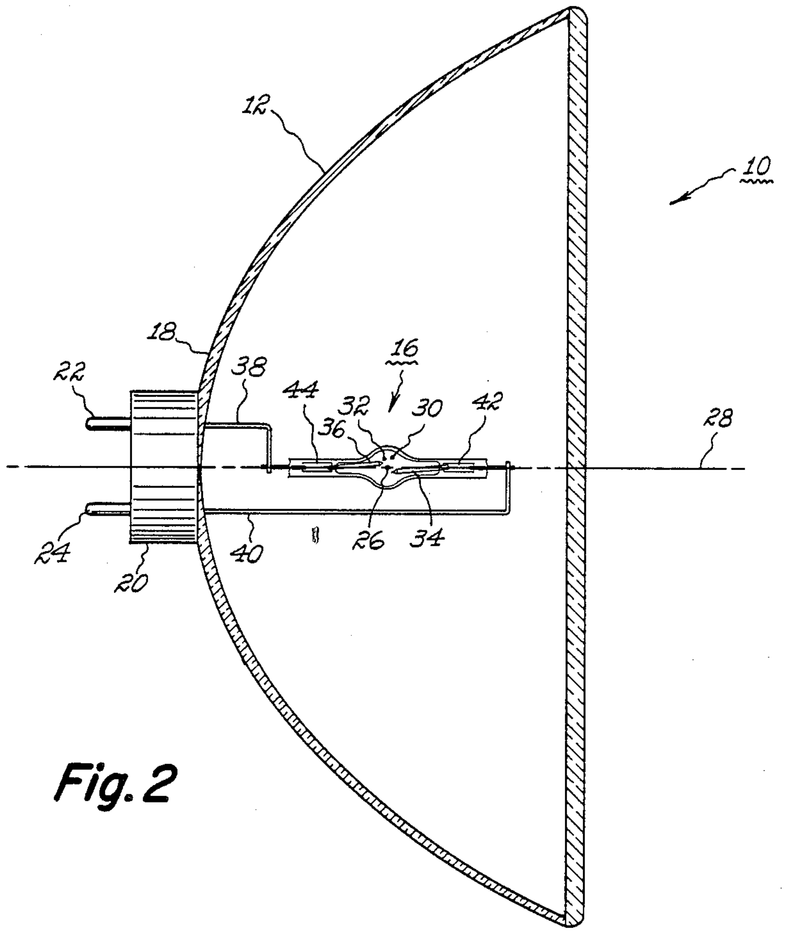
FIG. 2 is a top view generally illustrating an automotive headlamp in accordance with the present invention having its light source oriented in a horizontal axial manner.

The reflector 12 has a predetermined focal length 26 measured along the axis 28 of the automotive headlamp 10 and located at about the mid-portion of the inner envelope 16. The inner envelope 16 is predeterminedly positioned within the reflector 12 so as to be approximately disposed near the focal length 26 of the reflector. For the embodiment illustrated in FIG. 1, the inner envelope 16 is oriented in a vertical and transverse manner relative to the axis 28 of the reflector 12, whereas, FIG. 2 illustrates the inner envelope 12 as being oriented in a horizontal manner relative to and along the axis 28 of the reflector 12.

As will be discussed hereinafter, one of the main advantages of the inner envelope 16 having a fill of xenon gas is that its generated light is focussed at a relatively small tiny spot in front of one of its electrodes (the cathode) and is not spread between its electrodes. The concentration of the generated light at this tiny spot provides for a substantial reduction in the size and shape of the related reflector comprising the automotive headlamp. Further, as will be described, the present invention moves this concentrated light from a first location 30 to a second location 32 which respectively corresponds to the required placement of the light source so as to provide low beam illumination of the headlamp and high beam illumination of the headlamp from the same lamp by reversing the polarity of the excitation applied across the electrodes.

The reflector 12 that cooperates with the inner envelope 16 has a parabolic shape with a focal length in the range of about 6 mm to about 35 mm with a preferred range of about 8 mm to about 20 mm. The lens 14 is mated to the front section of the reflector 12. The lens 14 is of a transparent material selected from the group consisting of glass and plastic. The transparent member has a face preferably formed of prism members.

The first location 30 of the reflector 12 corresponding to the concentration of the light source for the low beam illumination is measured at a distance in the range of about 8 mm to about 20 mm along the axis from the rear section and upward therefrom by an amount in the range of about 1 mm to about 5 mm. Further, the second location 32 of the reflector 12 corresponding to the concentration of the light source for the high beam illumination is measured at a distance in the range of about 8 mm to about 20 mm measured along the axis 28 and down therefrom by an amount of about 0 mm to about 5 mm.

The inner envelope 16 has a pair of electrodes 34 and 36 disposed at opposite ends thereof at its neck portions and separated from each other by a predetermined distance in the range of about 1 mm to about 5 mm. The inner envelope 16 is connected to the rear section of the reflector 12 by means of relatively heavy inleads 38 and 40 each having one end respectively connected to electrodes 34 and 36 and their other end respectively connected to prongs 22 and 24. The electrodes 34 and 36 are of a rod-like member formed of a material preferably selected from the group comprising tungsten and tungsten with 1-3% thorium. The rod-like electrodes 34 and 36 each have a tip portion at one end which are offset from each other by an amount in the range of about 1 mm to about 5 mm. Further the electrodes 34 and 36 each have a flattened portion (not shown) for mating and respectively connecting to the foil members 42 and 44 sealed in the neck portions for one embodiment of the present invention applicable to a quartz inner envelope 16. Each of the foil members 42 and 44 are electrically connected to their respective inleads 38 and 40. For another embodiment related to an inner envelope 16 preferably of a type #180 glass available from the General Electric Company, the electrodes 34 and 36 may be a rod-like members preferably welded to molybdenum inleads which may be directly sealed in the #180 glass, thereby eliminating the need of foil members 42 and 44.

The inner envelope 16 is of an elongated body having an overall length in the range of about 15 mm to about 40 mm, neck portions with a diameter in the range of about 2 mm to about 5 mm, and bulbous shape central portion having a mid-portion with a diameter in the range of about 6 mm to about 10 mm. The inner envelope 16 is smaller in size in terms of wattage and physical dimensions relative to known prior art xenon lamps. The inner envelope 16 has a xenon fill, to be described, and has typical wattage ratings of 50 watts or less whereas known prior art xenon lamp have typical wattage ratings of 75 watts or more. Typical prior art xenon lamps have a 12 mm diameter or more and an overall length of 80 mm whereas the inner envelope 16 of the present invention has a diameter of 10 mm or less and an overall length of 35 mm or less.

The inner envelope 16 is a tipless type which is different than known prior art xenon lamps having a distorted portion on its central or bulbous section created during its fabrication by having an exhaust tube that is used to supply a fill gas to the bulbous section being tipped or severed so as to be removed from the known prior art lamp. The tipless inner envelope 16 of the present invention not having a distorted portion on its bulbous section is advantageous in any kind of optical system such as the automotive headlamp 10. As will be described hereinafter, the inner envelope 16 having the fill of xenon generates a high intensity concentrated spot of light from which most of radiation created by lamp 16 emanates. The tipless inner envelope 16, devoid of the defect surface on its bulbous portion, does not distort the radiation emanating from concentrated spot and allows this undistorted light to be reflected by reflector 12 into useful direct light for an optical system such as automotive headlamp 10.

Figure 3:
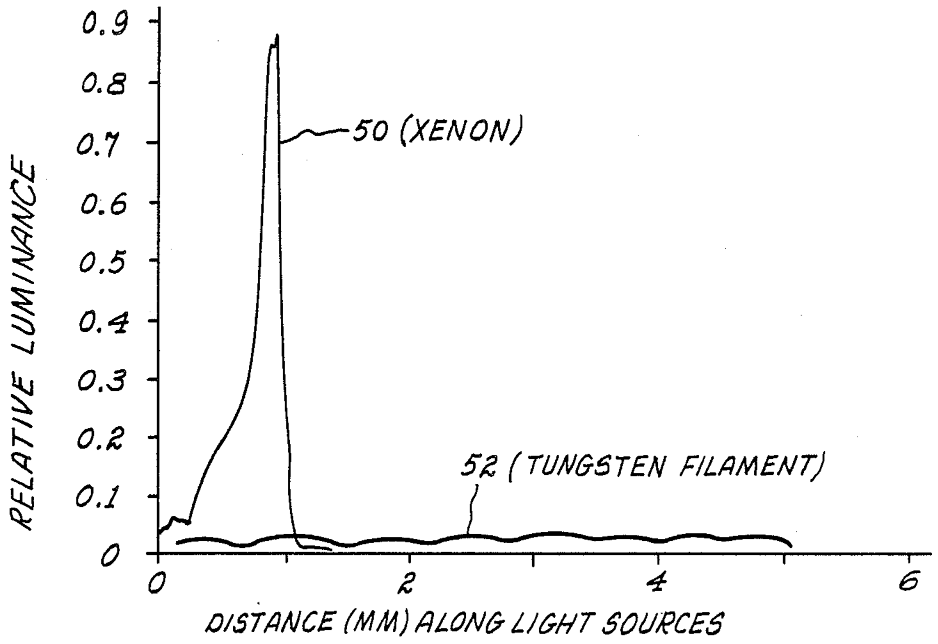
FIG. 3 illustrates the luminance as it depends on position of a xenon source of the present invention in comparison with the luminance of an incandescent element typically used for automotive headlamps.

The inner envelope 16 contains a xenon gas and has two different pressures, the first being a fill pressure at room temperature in the range of about 4 atmospheres to about 15 atmospheres, and the second being a relatively high operating pressure of about 20 atmospheres to about 65 atmospheres. The xenon light source 16 provides the automotive headlamp 10 of the present invention with various benefits relative to prior art automotive headlamp having as its light source an incandescent filament. These benefits may be first described with reference to FIG. 3. FIG. 3 illustrates a first plot 50 related to the xenon light source of the present invention and a second plot 52 related to a tungsten filament typically employed as the light source for an automotive headlamp. FIG. 3 has an X coordinate shown as a distance (mm) measured along the light sources related to plots 50 and 52, and a Y coordinate given in the relative luminance which is meant to represent the amount of lumens per unit area. The length of the light source filament is approximately 5 mm, whereas, the length of the xenon light source is approximately 1 mm.

The plot 52 is of a sinusoidal shape having a relative luminance of less than about 0.05 occurring all along the filament 52, whereas, the plot 50 is peaked-shaped with the upper-most peak occurring at approximately 1 mm along the light source 16 and having a relative luminance value of near 0.9. A comparison of plots 50 and 52 reveals that the xenon light source of the present invention provides for a substantially higher amount of luminance and such luminance is confined to a relatively small distance such as 1 mm. The concentrated light distribution of xenon lamp 16 may further be described with reference to FIGS. 4(A) and 4(B).

FIGS. 4(A) and 4(B) are interrelated in that FIG. 4(A) illustrates a isocandle plot of the light created by the xenon lamp between its electrodes 34 and 36, and FIG. 4(B) illustrates the energy distribution along the axis between the electrodes 34 and 36 of the xenon lamp. The electrode 34 is the cathode of the lamp and the electrode 36 is the anode of the lamp. This fixed orientation of electrodes is applicable for D.C. operation of the xenon lamp, but for A.C. operation of the lamp the orientation of the electrodes are reversed during each half-cycle of the applied A.C. excitation.

The overall light distribution of FIG. 4(A) is represented by a relatively symmetrical profile 54 which has confined therein a more intense light source profile 56, having a tail portion 58 extending toward the anode 36. The most intense portion of the light distribution 56 is shown by a concentration or spot of light 60 which corresponds to the location of the peaked portion 62 of the xenon light plot 50 shown in FIG. 4(B).

The plot 50 of FIG. 4(B) is similar to that of FIG. 3 with the exception that FIG. 4(B) is devoid of the filament light source plot 52 and shows the a plot 50 which has been expanded in the 0.0 to 1.4 mm region of the distance along xenon light source 16. From FIG. 4(B) it should be seen that the peaked portion 62 of the light source 16 occurs approximately between 0.8 and 1.0 along the distance of light source which also corresponds to spot 60 of FIG. 4(A). Such a concentration of light source has substantial benefits relative to reducing the dimensions of an automotive headlamp and may be further described with reference to FIGS. 5(A) and 5(B).

Figure 5B:
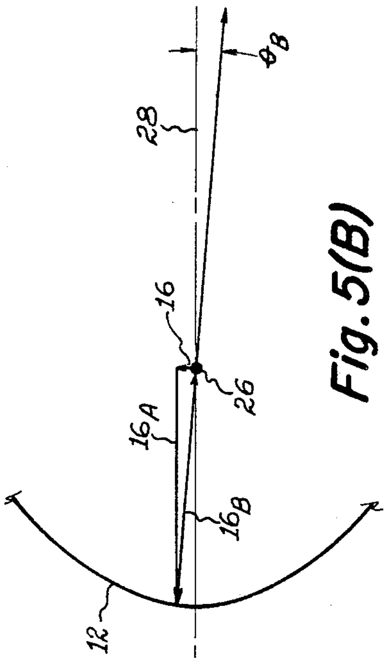
FIGS. 5(A) and 5(B) respectively illustrate a comparison of the light beam divergence of an automotive headlamp system using an incandescent light source and the xenon light source of the present invention in reflectors of the same size.
Figure 5A:
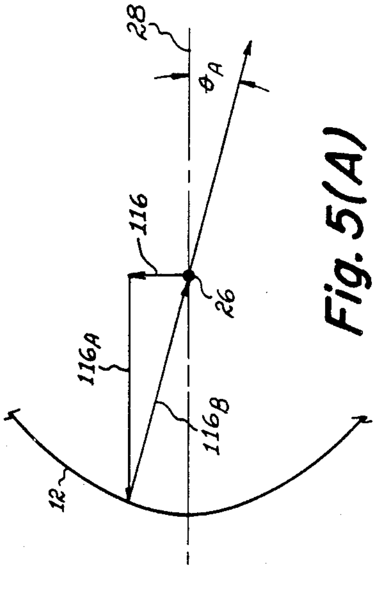

FIGS. 5(A) and 5(B) are interrelated and show a comparison of the divergence of the beam produced by a headlamp using a tungsten filament 116 compared to that produced by a headlamp having the smaller xenon light source 16 of the present invention. FIG. 5(A) shows the light source 116 indicated in the form of an arrow having its mid-portion located at the focal point 26 along the axis 28 of the reflector 12, whereas, FIG. 5(B) shows the xenon light source 16 in the form of an arrow having its mid-portion located at the focal point 26 along the axis 28 of reflector 12 having the same dimensions as of FIG. 5(A). The incandescent light source 116 may have a length such as 5 mm as discussed with regard to FIG. 2, whereas, the xenon light source 16 has a length of approximately 1 mm discussed with regard to FIGS. 3, 4(A) and 4(B).

The incandescent filament 116 when activated provides for a plurality of reflected light rays that diverge at a rate which is proportional to the size of the light source 116 and is represented by the angle $\theta_A$. Similarly, the xenon light source 16 provides for a plurality of light rays that diverge from each other by an angle $\theta_B$.

With reference to FIG. 5(A), the angle of divergence of the filament 116 is illustrated by a light ray $116_A$ emitted from the upper most portion of filament 116 which is intercepted and reflected by reflector 12 as light ray $116_B$. The angle between the light ray $116_B$ which passes through the focal point 26 and the axis 28 is the divergence angle $\theta_A$ of filament 116. For the values previously given to the filament 116 (5 mm) and the reflector 12 (focal length 25 mm), this angle $\theta_A$ is 11.3°.

FIG. 5(B) shows light rays $16_A$ and $16_B$ which are similar to light rays $116_A$ and $116_B$ and describe with regard to FIG. 5(A). The angle of the divergence $\theta_B$ produced by the light rays emitted by the xenon light source 16, for the previously given values of the light source 16 (1 mm) and the reflector 12 (focal length 25 mm), is 2.26°. The angle of divergence $\theta_B$ is approximately five times smaller than the angle of the divergence $\theta_A$ The overall effect of such light produced by the xenon light source 16 is that a desired beam pattern, developed by the automotive headlamp 10 of the present invention and directed to a roadway has less spread and may therefore be directed where it is needed to illuminate the road with less light where it is not wanted. The reduction of this spread or unwanted light by the xenon light source 16, relative to an incandescent light source 116, reduces the veiling or concealing effect of fog, rain and snow and thereby provides more useful direct light for automotive applications.

Figure 6B:
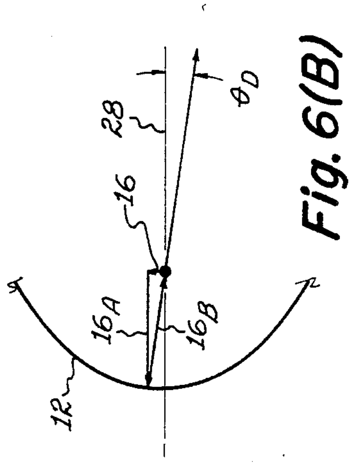
FIGS. 6A and 6B comparatively illustrate the size of the reflector needed for the use of an incandescent light source and the xenon light source of the present invention in order to have the same light beam divergence.
Figure 6A:
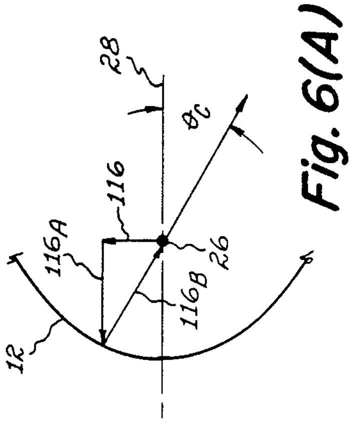

A further advantage provided by the relatively small size of the xenon light source 16 is to reduce the necessary size of the reflector of the automotive headlamp and may be described with reference to FIGS. 6(A) and 6(B). FIGS. 6(A) and 6(B) are respectively similar to FIGS. 5(A) and 5(B) and use similar reference numbers where applicable. FIGS. 6(A) and 6(B) are different in that the focal length 26 has been reduced by a factor of two (2) relative to the focal length 26 respectively shown in FIGS. 5(A) and 5(B). Further, the reflector 12 of FIGS. 6(A) and 6(B) has been reduced in height by a factor of about 2/3 relative to that of FIGS. 5(A) and 5(B).

FIG. 6(A) shows that the tungsten incandescent filament 116 produces light rays $116_A$ and $116_B$ in which ray $116_B$ forms an angle of divergence $\theta_C$ having a value of about 21.8° for the reflector of FIGS. 6(A) and 6(B) and previously given values of filament 116 (5 mm length) which would produces stray light in a beam pattern of a sufficient amount that would not meet the needs of the automotive technology. Conversely, FIG. 6(B) shows the xenon light source 16 of about 1 mm producing light rays $16_A$ and $16_B$ in which ray $16_B$ forms an angle of divergence $\theta_D$ having a value of about 4.5° which produces a beam pattern having a limited amount of stray light so as to more than meet the needs of the automotive technology. The effect of the smaller size xenon light source 16 allows for an increase in the collection efficiency of the reflector 12 through a reduction in its focal length and a slightly smaller reduction in its overall dimensions. The overall effect is that the xenon light source allows for both decreasing the size of the reflector and improving the collection efficiency of the reflector by sufficient amounts so as to allow the automotive designer to decrease the hood lines of the automobile as discussed in the "Background" section. It is contemplated that the practice of the present invention allows for a reduction of the reflector for an automotive headlamp by a factor of 4/5 relative to prior automotive headlamp utilizing a typical incandescent filament so that the hood lines of the automobile may be correspondingly reduced.

Figure 7A:
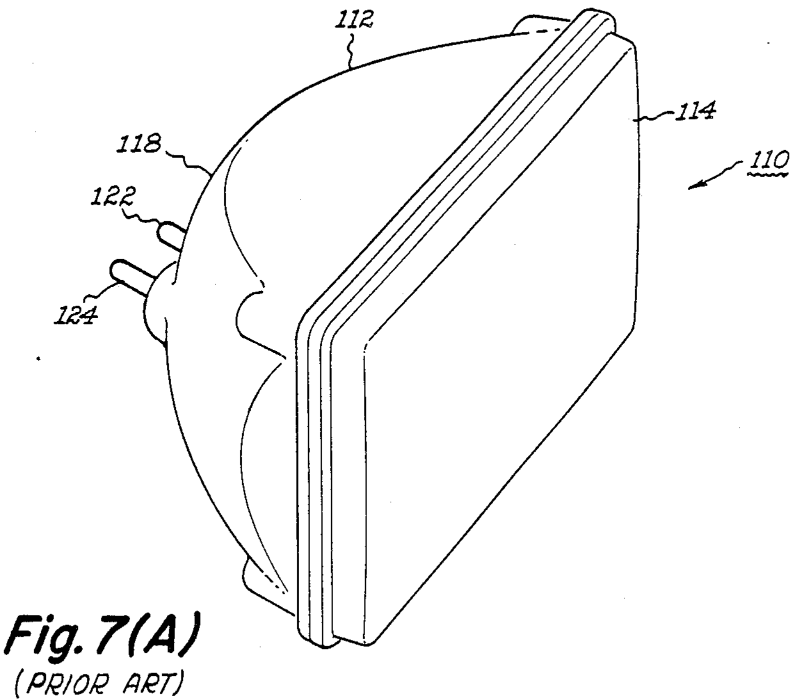
Fig. 7(A) (PRIOR ART)
FIGS. 7(A) and 7(B) are respective perspective views of a prior art rectangular automotive headlamp and a rectangular automotive headlamp in accordance with one embodiment of the present invention.
Figure 7B:
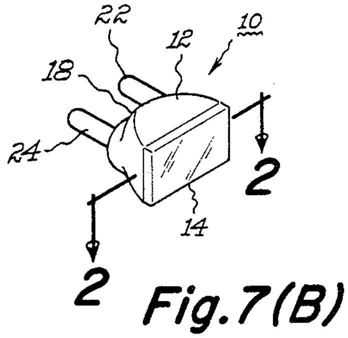

The overall reduction of the dimensions of the reflector and thereby the corresponding dimensions of the automotive headlamp may be illustrated with reference to FIGS. 7(A) and 7(B). FIG. 7(A) is a perspective view illustrative of a prior art rectangular automotive headlamp employing an incandescent filament and having similar elements of the automotive headlamp 10 of FIGS. 1 and 2 with corresponding reference numbers that have been increased by a factor of 100. FIG. 7 (B) is a perspective view illustrative of one embodiment of the present invention being a rectangular automotive headlamp 10 shown in FIGS. 1 and 2 and having dimensions that have been reduced relative to the prior art lamp 100 by a factor of about 80% in accordance with the description of the lamp 10 given hereinbefore. From a comparison between FIG. 7 (A) of the prior art lamp 100 and FIG. 7 (B) is may be easily seen that the practice of the present invention provides the automotive designers with the means in the form of the xenon lamp 16 to substantially reduce the hood lines of the automobile.

A primary advantage of the xenon light source 16 is that the generated light is concentrated at the relatively small spot 60 discussed with regard to FIG. 4(A) and having the related peak portion 62 of FIG. 4(B). As seen in FIG. 4(A) this concentrated spot 60 is located in front of the cathode 34 and is not spread between the electrodes 34 and 36 such as that which occurs for other discharge lamps. This concentrated spot of the generated light of the xenon lamp 16 provides for substantial reductions in the related reflectors for automotive applications relative to light sources such as tungsten filaments generating light along their incandescent filament or other discharge devices generating light spread across and between their separated electrodes. This concentrated spot may advantageously find application in an automotive headlamp in which the spot is selected to be positioned at a predetermined location relative to a reflector device so as to produce a desired illumination need such as, low or high beam pattern for the automobile.

A further advantageous feature of the xenon light source of the present invention is the ability to control and utilize the position of the bright spot 60 located in front of the cathode 34 shown in FIG. 4(A) and FIGS. 1 and 2. Automotive headlamps may typically require two different beams, one for high beam illumination and one for low beam illumination. By selecting the distance of the arc-gap between the electrodes 34 and 36 and then orienting the position of the high intensity spot 60 at the previously discussed first location 30 of the reflector 12 shown in FIG. 1, the high intensity spot 60 upon the activation of the xenon light source 16 is at a desired first location so as to provide for the low beam illumination of the automotive headlamp 10. Further, by reversing the polarity of the excitation applied to the electrodes such as D.C. current, the electrode 36 act as the cathode and the electrode 34 act as the anode so that the high intensity spot 60 is then located at the second location 32 of the reflector so as to provide for the high beam illumination of the automotive lamp.

The xenon lamp 16 may also be advantageously operated by current interruption operating circuit disclosed in U.S. patent application Ser. No. 26,808 of K. A. Roll et al. filed Mar. 17, 1987, assigned to the same assignee as the present invention, herein incorporated by reference and to which reference may be made for further details of its operation. The current interrupt operating circuit controls the duty cycle of its described current interrupt switch so as to maintain a predetermined power level in the xenon lamp 16 of the present invention. As discussed in U.S. patent application Ser. No. 26,808, the system efficiency of operating a discharge lamp such as the xenon lamp 16 by means of current interruption is contemplated to be an improvement in excess of 50% relative to prior art methods of operating gas discharge devices.

For automotive applications, the electrodes 34 and 36 of xenon lamp 16 are desired to be capable of conducting a relatively high current which creates a condition in which the voltage drop across the lamp 16 is about 15 volts with most of this voltage appearing at the electrodes. This electrode drop is reduced in the present invention preferably by the use of a thoria doped tungsten material for both the electrodes 34 and 36. The presence of thorium material placed onto the tungsten lowers the work function of the electrodes and therefore their voltage drop when compared to electrodes formed of pure tungsten.

Symmetric electrodes, that is, both the electrodes having substantially the same dimensions and alternately acting as cathodes and anodes may be used if both the high and low beam are to be produced by reversing the polarity of the D.C. current applied across the lamp. Symmetrical electrodes have advantages over prior art xenon lamps in that these prior art devices are commonly operated from a D.C. source and have a cathode electrode which is small relative to its anode electrode that is used to dissipate heat. The symmetrical electrodes of the present invention are not limited to D.C. operation but may be used for either D.C. or A.C. applications and due to the lower wattage rating of the xenon lamp 16, relative to prior art xenon lamps, the cathode of the present invention is smaller than prior cathodes or anode electrodes.

For applications of the xenon lamp 16 of the present invention using A.C. excitation for the electrodes 34 and 36, the concentrated light source 60 is alternately positioned between locations 30 and 32 of the reflector so that the light developed by the reflector will be compositely combined to produce the desired illumination for automotive applications. A further benefit of the xenon lamp operated with both A.C. and D.C. excitation is related to the instantaneous occurring brightness of the lamp 16 and the quality of light it produces. The xenon lamp, having the parameters as previously discussed, provides for a color temperature in the range of about 6000° K. that is in the blue-white visible spectrum and creates an impression of high brightness. This color temperature is further advantageous obtained in that 90% of the color temperature range is reached within a time of about 1 second measured from the application of the excitation across the electrodes which initiates ionization of the xenon ingredient within the lamp 16. The xenon lamp is further advantageous in that if the lamp is momentarily turned-off and then back-on, there is substantially no change in its light output. The instant light and relight features of the xenon lamp is particularly suited for automotive applications and substantially duplicates that of a tungsten incandescent light source of prior automotive headlamps.

It should now be appreciated that the practice of the present invention provides for a xenon light source having a relatively small size which provides for a desired beam pattern of the automotive headlamps while at the same time allowing for substantial reductions in the overall size of the related reflector. The small size of the xenon light source also improves the collector efficiency of the reflector itself which contributes to the reduction in the needed size of the reflector. The symmetry of the light developed by the xenon light source makes it possible to utilize a larger fraction of the reflector to create a desired beam pattern for automotive applications. Further, the color temperature of the light produced by the xenon light source is about 6000°K. which is in the blue-white spectrum of the electromagnetic energy and creates the appearance to the eye of being a highly bright source. The spectrum related to the xenon light source is continuous and provides for good color rendition.

The xenon lamp 16 of the present invention also has a relatively long anticipated life such as 2000 hours, which, in turn, provides for the needs of the automotive headlamps for more than its anticipated life.

Although the previously given description of the xenon lamp was related to automotive application, it is contemplated that the practice of this invention is equally applicable to other various lighting applications. A significant feature of the present invention is that instantaneous light is generated by the xenon lamp 16 having small dimensions relative to prior art xenon lamps. The reduced dimensions of xenon lamp 16 allows its usage in devices such as reproductive devices employing xenon lamp and to correspondingly reduce the related mounting and focussing arrangements. The feature of providing instantaneous light from the relatively small light source of the present light source allows it to be advantageously utilized in various lighting applications, homes, office and other various commercial and industrial environments.

What we claim as new and desire to secure by Letters Patent of the United States is

1. A light source comprising;

a tipless envelope having a pair of electrodes disposed therein and separated from each other by a predetermined distance, wherein said disposed electrodes comprises;

(A) A pair of rod like members formed of a material selected from the group consisting of tungsten and tungsten with 1–3% thorium, said rod-like members each having a tip portion at one end offset from each other and having a flattened portion for mating with and electrically connected to respective means including inleads for connection to an excitation source; and (B) Said tip portion of said disposed electrodes being offset from each other by said predetermined distance having a range from about 1 mm to about 5 mm said envelope containing a fill consisting of a xenon gas having a fill pressure in the range of about 4 atmospheres to about 15 atmospheres and an operating pressure in the range of about 20 atmospheres to about 65 atmospheres, said envelope being of a material selected from the group consisting of glass, and quartz and being of an elongated body having an overall length in the range of about 15 mm to about 40 mm, said body having opposite neck portions having a diameter in the range of about 2 mm to about 5 mm, a bulbous shaped central portion having a mid-portion with an outer diameter in the range of about 6 mm to about 10 mm, and an inner diameter of the bulbous shaped central portion having a range of about 4 mm to 10 mm.

2. A light source according to claim 1 wherein said electrodes are formed of thoria doped tungsten material.

3. A light source according to claim 1 wherein said electrodes are symmetrical having substantially the same dimensions.

4. An automotive headlamp comprising;

(A) a reflector having a section to which is mated means capable of being connected to an excitation source of an automobile, said reflector having predetermined focal length and focal point;

(B) a lens mated to the front section of said reflector; and (C) an inner envelope positioned at a predetermined location within said reflector so as to be approximately disposed near said focal point of said reflector, said inner envelope containing a fill consisting of a xenon gas having a fill pressure in the range of about 4 atmospheres to about 15 atmospheres and an operating pressure in the range of about 20 atmospheres to about 65 atmospheres, said, inner envelope having a pair of electrodes disposed therein with a tip portion at one end and said tip portion of said disposed electrodes being offset from each other by said predetermined distance having a range from about 1 mm to about 5 mm separated from each other by a predetermined distance, disposed therein with a tip portion at one end and said tip portion of said disposed electrodes being offset from each other by said predetermined distance having a range from about 1 mm to about 5 mm envelope being connected to said means to said section so that said excitation source is capable of being applied across said electrodes, whereby upon such application said fill of xenon is excited and generates a high intensity source of light that is highly concentrated at a spot at a predetermined position in front of one of the said pair of electrodes, said concentrated spot having dimensions relatively smaller than said separation between said electrodes.

5. An automotive headlamp comprising:

(A) a reflector having a section to which is mated means capable of being connected to an excitation source of an automobile, said reflector having a predetermined focal length and focal point and a first location for the desired placement of a light source to yield low beam illumination of said headlamp and a second location for the desired placement of a light source to yield high beam illumination of said headlamp;

(B) a lens mated to the front section of said reflector; and (C) a inner envelope positioned at a predetermined location within said reflector so as to be approximately disposed near said focal point of said reflector, said inner envelope containing a fill consisting of xenon gas having a fill pressure in the range of about 4 atmospheres to about 15 atmospheres and a operating pressure in the range of about 20 atmospheres to about 65 atmospheres said inner envelope having a pair of electrodes disposed therein with a tip portion at one end of said tip portion of said disposed electrodes being offset from each other by said predetermined distance having a range from about 1 mm to about 5 mm and separated from each other by a predetermined distance, with a tip portion at one end of said tip portion of said disposed electrodes being offset from each other by said predetermined distance having a range from about 1 mm to about 5 mm said inner envelope being connected to said means mated to section so that said excitation source is capable of being applied across said electrodes, whereby upon such application said fill of xenon is excited and generates a high intensity source of light that is highly concentrated at a spot at a predetermined position in front of one of said pair of electrodes corresponding to said first or said second location of said reflector, said concentrated spot having dimensions relatively smaller than said separation between said electrodes.

6. An automotive headlamp according to claim 5 wherein said excitation source applied to said electrodes is of a direct current (D.C.) type capable of being of a first and a second polarity, whereby upon such application of said first polarity causes said highly concentrated spot to be located at said first location and upon such application of said second polarity causes said high concentrated spot to be located at said second location.

7. An automotive headlamp according to claim 3 wherein said reflector comprises;

a parabola of revolution having a focal length in the range from about 8 mm to about 20 mm.

8. An automotive headlamp according to claim 4 wherein said reflector comprises;

(A) a parabola of revolution having a focal length in the range of about 8 mm to about 20 mm, (B) said first location of said reflector being at a distance in the range of about 8 mm to about 20 mm, as measured along the axis of said reflector from said rear section and upwardly therefrom by an amount in the range of about 1 mm to about 5 mm; and (C) said second location of said reflector being at a distance in the range of about 8 mm to about 20 mm as measured along said axis of the reflector from said rear section and downward therefrom by an amount in the range of about 0 mm to about 5 mm.

9. An automotive headlamp according to claim 3 wherein said lens comprises;

a transparent member formed of a material selected from the group consisting of glass and plastic, said transparent member having a face with prism shaped members.

10. An automotive headlamp according to claim 4 wherein said lens comprises;

a transparent member formed of a material selected from the group consisting of glass and plastic, said transparent member having a face with prism shaped members.

11. An automotive headlamp according to claim 3 wherein said excitation source capable of being applied across said electrodes is a D.C. type having a voltage value in the range of about 12 volts to about 20 volts, said excitation source when applied across said electrodes causing excitation of said xenon to yield a color temperature in the range of about 6000°K. with at least 90% of said color temperature range being reached within a time range of about 1 second measured from the application of said excitation across said electrodes.

12. An automotive headlamp according to claim 4 wherein said excitation source capable of being applied across said electrodes is a D.C. type having a voltage value in the range of about 12 volts to about 20 volts, said excitation source when applied across said electrodes causing excitation of said xenon to yield a color temperature in the range of about 6000° K. with at least 90% of said color temperature range being reached within a time range of about 1 second measured from the application of said excitation across said electrodes.

13. An automotive headlamp according the claim 3 wherein said excitation source capable of being applied across said electrodes is of a A.C. type having a voltage value in the range of about 12 to about 20 volts, said excitation source when applied across said electrodes causing excitation of said xenon to yield a color temperature in the range of about 6000°K., at least 90% of said color temperature range being reached within a time of about 1 second measured from the application of said excitation across said electrodes.

14. An automotive headlamp according to claim 4 wherein said excitation source capable of being applied across said electrodes is of a A.C. type having a voltage value in the range of about 12 to about 20 volts, said excitation source when applied across said electrodes causing excitation of said xenon to yield a color temperature in the range of about 6000°K. at least 90% of said color temperature range being reached within a time of about 1 measured from the application of said excitation across said electrodes.

15. An automotive headlamp according to claim 7 wherein said concentration of said high intensity light source provides for a plurality of reflected light rays that do not divert from each other by an angle having a value which is less than about 5°.

16. An automotive headlamp according to claim 8 wherein said concentration of said high intensity light source provides for a plurality of light rays that do not diverge from each other by an angle having a value of less than about 5°.

* * * * *